Patented July 13, 1943

2,324,240

UNITED STATES PATENT OFFICE 2,324,240

PROCESS FOR DEHYDRATION

Albert Schaafsma, Amsterdam, Netherlands, assignor to Shell Development Company, San Francisco, Calif., a corporation of Delaware No Drawing. Application April 4, 1940, Serial No. 327,931. In the Netherlands June 1, 1939

9 Claims. (Cl. 196—13)

The present invention relates to dehydration, and more particularly pertains to a process for the efficient dehydration of substances boiling above, but relatively close, to the boiling point of water, these substances, furthermore, having the property of reacting not at all or only slightly when in the presence of small quantities of water, but of decomposing considerably when in the presence of relatively larger quantities of water.

It is known that some substances or compounds which do not react to any substantial degree when in contact or commingled with small percentages of water, are decomposed when the water concentration becomes excessive or exceeds a certain limit. If the water and such substance or compound boil at relatively widely separated temperatures, the dehydration of such a substance does not present any difficulties. For example, if the substance to be dehydrated boils at a temperature considerably higher than the boiling point of water, such substance may be readily obtained in a substantially or even completely anhydrous state by merely heating the wet or water-containing substance so as to distill off the water without any evaporation of the substance or compound to be dehydrated. Obviously, such a procedure is applicable for the dehydration of compounds which do not sublime at the temperature necessary for the complete or substantial evaporation of their water content.

On the other hand, there is a number of substances or compounds which boil relatively close to the boiling point of water, so that their dehydration necessitates the use of rectification and/or refluxing to effect a complete or substantially complete separation of water. When such substances containing water are subjected to a dehydration, for example by distillation in a still provided with a rectification column, the various stages of the rectification column will contain different concentrations of the water and of the substance to be dehydrated. Therefore, if the substance to be dehydrated boils above the boiling point of water, and if such substance, although substantially unaffected when in contact with small percentages of water, reacts or decomposes when the water content exceeds a certain limit, there will be a stage in such rectification column wherein, besides the substance in question, water occurs in such concentration as to bring about an intensive reaction between the water and said substance. In the case of a continuous dehydration with rectification the undesirable mixture of the substance containing an excessive percentage of water will remain in the same place or stage of the rectification column. The concentrations of water increase in an analogous manner when the dehydration is effected without a rectification column, but by employing a so-called cross current distillation, i. e. a distillation in which one of the phases, e. g. the liquid, is several times in contact with e. g. vapours freshly formed from the liquid phase. The reverse is also possible, i. e. the vapours are cooled in stages and the liquid freshly formed in each stage and being in contact with said vapour phase is removed from the system in every stage. It is evident that the latter process is likewise known in the art as a dephlegmation in stages. As stated, such excessive percentages of water effect the decomposition of the substance or compound subjected to dehydration. The formation of these products of decomposition, besides lowering the yield of the desired anhydrous or substantially anhydrous substance, may also be undesirable and/or detrimental in that these products may cause corrosion or clogging of the various apparatus. Also, such products of decomposition may be in the form of solid water-insoluble substances, such as inorganic metal compounds, the removal of which from the various apparatus may be difficult, impossible or, at least, uneconomical and/or cumbersome.

It is therefore the main object of the present invention to provide a process which will avoid the above and other defects. Another object is to provide a process whereby substances or compounds having a somewhat higher boiling point than water, and which are substantially unaffected by small percentages of water but are decomposed when in contact with larger quantities thereof, may be effectively and substantially quantitatively dehydrated without decomposition. Still other objects will be apparent from the following disclosure.

It has been discovered that the above and other objects may be attained by subjecting such substances containing relatively small percentages of water to a distillation (with or without rectification) in the presence of an auxiliary agent which has a boiling point intermediate that of water and of the substance subjected to dehydration, such auxiliary agent being inert with respect to the substance to be dehydrated, i. e., not substantially reactive therewith. Preferably, this auxiliary agent should be immiscible or substantially immiscible with water, although completely or substantially miscible with the higher boiling substance to be dehydrated. This facilitates the complete dehydration since it reduces the partial vapor pressure of the substance to be dehydrated.

The present process is applicable for the dehydration of a number of substances, compounds or mixtures thereof with each other and/or with other compounds. As stated, the process finds utility in the dehydration of substances or compounds which boil above, but relatively close to the boiling point of water. The process, furthermore, is particularly adapted for the dehydration of such compounds which although substantially unaffected when in the presence of small percentages of water, react with and are decomposed by relatively large percentages thereof. Although such substances having a higher boiling point than water may be of organic origin, the process of the present invention finds particular utility for the dehydration of liquid inorganic compounds of the above outlined class. As representative examples of organic substances which may be dehydrated advantageously according to the present process, reference is made to the readily hydrolyzable esters or substituted esters, for example, halides thereof, as well as organic halides, such as valeryl chloride, benzoyl chloride, benzoyl bromide, and the like, their homologues and analogues, all of which boil above but relatively close to the boiling point of water, and which decompose when in contact with water in relatively high concentrations.

The inorganic substances which may be dehydrated according to the present process include substances, such as salts, which yield oxy-compounds with relatively large quantities of water. As such, reference may be made to antimony trichloride, antimony tribromide, arsenic trichloride, arsenic tribromide, and the like. Generally, it may be said that the salts, and particularly the halides, of metals of the right hand column of group V of the periodic table may be thus treated. However, the invention is not to be considered as being limited only to the dehydration of these compounds since the salts of other acids and/or of other metals may also be thus dehydrated as long as such compounds, while boiling above but relatively close to the boiling point of water, form undesirable products of decomposition when in contact with relatively large quantities of water. For example, tin tetrachloride and other like compounds may be thus dehydrated, this compound boiling at 114.1° C. and being decomposed when in contact with large quantities of hot water. Although the above examples refer to chlorides and bromides, the substances to be freed from the relatively small percentages of water contained therein may also comprise the fluorides of the above and similar metals, as well as mixtures of these halides.

As noted, the auxiliary agent to be employed in the distillation step according to the present invention should have a boiling point between that of water and of the substance to be dehydrated. The agent should not react with such substance nor be decomposed by it. Also, preferably, such auxiliary agent should be at least substantially immiscible with water, but completely or substantially miscible with the higher boiling substance or substances to be dehydrated. Representative auxiliary agents which may be employed for the dehydration of the above-described substances from small quantities of water present therein include extracts obtained from the solvent extraction of light hydrocarbon fractions, such as gasoline and the like, with selective solvents of the type of sulfur dioxide, furfural, nitrobenzene, etc. Also, aromatic hydrocarbons with or without side chains and whether halo-substituted or not, such as toluene, zylene, 1-phenyl-pentane, 1-bromo-3-chlorobenzene, and the like, their homologues and analogues, may be used. The aliphatic hydrocarbons, and particularly halogenated derivatives thereof, are still another group of auxiliary agents which may be employed in connection with the present process. As such, may be mentioned tetrachlorethane, 1,1,2-trichlorethane, 1 - bromo - 2 - methyl - butane, 1-iodo-2-methyl-butane, 2-iodo-2-methyl-butane, and the like. It is not to be understood that all of these compounds are equally effective as auxiliary agents, nor that they may all be used as such for the dehydration of any substance according to the present process. This is due to the fact that the auxiliary agent must have a boiling point between that of water and the boiling point of the substance or substances to be dehydrated. Therefore, some of the auxiliary agents, although they may possess all of the described characteristics rendering them suitable for use in the dehydration in accordance with the present process, may not be suitable for the dehydration of a particular substance, if, for example, the boiling point of such substance is below that of the given auxiliary agent, although such agent may be efficiently employed during the dehydration of other higher boiling substances of the described class. Broadly stated, however, any substance which boils between the boiling points of water and of the compound to be freed of small quantities of water present therein, and which substance is immiscible with and inert to water, and which is substantially miscible, although non-reacting with the compound to be dehydrated, is suitable as an auxiliary agent. The quantity of such agent to be used in the present process may vary within wide limits, and is really limited only by the economics of the distillation process and of the subsequent recovery of this agent for further use thereof.

The distillation according to the present process may be effected in single-stage or multi-stage units. The process is also adapted for feeding in the substances to be dehydrated in batches, or continuously, and may be employed in connection with units which may or may not be equipped with columns only having means for carrying out a mono- or multi-stage dephlegmation, i. e. the separation of heavy components from a vapor mixture by partial condensation, and removing the liquid formed in each stage from the system, or with rectification columns, i. e. columns in which the distillation is realized by counter-current contact with a refluxing medium. When the dehydration according to the present invention is effected in an apparatus provided with a rectification column, the added auxiliary agent will be present in such column between the water and the compound or compounds to be dehydrated, so that the substances capable of reacting with each other will be separated and the decomposition of the compound to be dehydrated is avoided. If the distillation is effected batch-wise in a structure which is not equipped with a column, the water commingled with at least some of the auxiliary agent will distill off first. As the distillation proceeds, the overhead fraction will gradually become richer in the auxiliary substance. If the distillation is continued, the compound to be dehydrated will distill off in the later stages of the distillation, this compound being by that time completely or, at least, substantially free from water. The occurrence of the dangerous or undesirable concentration of water in such compound is thus avoided when the distillation is effected in accordance with the present process and in the presence of the defined auxiliary agent.

As stated, the invention is particularly adapted for the dehydration of inorganic compounds which decompose in the presence of relatively large concentrations of water. For example, antimony trichloride, although substantially unaffected by small percentages of water, decomposes when the water concentration approaches or exceeds 1.7 mol parts, this decomposition being according to the following formula:

$$SbCl_3 + H_2O \rightarrow SbOCl + 2HCl$$

Thus, when the water concentration exceeds a certain limit, there is a loss of antimony trichloride and a precipitation of antimony oxy chloride (SbOCl). Therefore, the dehydration of antimony trichloride in the ordinary manner (without the use of the auxiliary agent), besides the loss of the relatively valuable primary material, also entails the clogging of the apparatus by the insoluble oxy chloride and the corrosion of the apparatus by the hydrochloric acid formed as a by-product. The same is true of the other substances described above. All of these defects are avoided by effecting the dehydration according to the present process in the presence of the above-defined auxiliary agent.

The following examples are presented for the purpose of illustrating suitable applications of the invention and modes of executing the same. These examples, however, are not to be considered as limiting the scope of the invention as to the reactants, mode of execution, reaction conditions, and the like. For instance, although the examples relate to the dehydration of antimony trichloride in the presence of toluene or xylene as the auxiliary agent, other compounds may be similarly dehydrated in accordance with the process of the present invention by using any of the outlined or similar auxiliary agents.

*Example I*

Antimony trichloride containing approximately 5% by volume of water was dehydrated by subjecting it to rectification, under complete refluxing and at atmospheric pressure, in a distillation and rectification column containing the equivalent of twelve (12) ideal trays. After a period of time, a part of the water condensed in the reflux column was separately withdrawn and analyzed. It was found that 1.22% of the antimony trichloride thus subjected to dehydration had decomposed.

*Example II*

A mixture of 100 milliliters (306 grams) of antimony trichloride and 5 grams of water was distilled at a temperature of 130° C. under a pressure of 10 mm. of mercury. The distillation was effected in a flask provided with a rectification column. An analysis of the overhead fraction indicated that approximately 0.95 gram of hydrogen chloride evolved, thus pointing to the decomposition of about 3 grams or approximately 1% of the antimony trichloride subjected to dehydration. This decomposition occurred in the column where a deposit of antimony oxy chloride was found.

*Example III*

A mixture consisting of 80 parts by volume of antimony trichloride, 4 parts by volume of water and 35 parts by volume of toluene, was distilled at atmospheric pressure under conditions similar to those employed in Example I. An analysis of the overhead fraction predominating in the toluene-water azeotropic binary showed that only about 0.20% by weight of the antimony trichloride subjected to distillation was decomposed to the oxy chloride.

*Example IV*

Antimony trichloride containing about 5% by volume of water was subjected to dehydration according to the process of the present invention. For this purpose it was commingled with xylene in such a proportion that the mixture consisted of 20 parts by volume of antimony trichloride, 1 part by volume of water and 10 parts by volume of xylene. This mixture was then subjected to distillation at atmospheric pressure and under total refluxing in a still equipped with a long rectification column. The distillation was conducted for the same period of time as that employed in Example I. An analysis of the overhead fraction indicated that only about 0.11% by weight of the antimony trichloride was decomposed during this dehydration operation.

A comparison of the data presented in Examples I, III and IV shows that the dehydration in the presence of an auxiliary agent of the character described greatly decreases the percentage of the antimony trichloride which is decomposed to its oxy chloride during the dehydration step. Thus, the use of toluene lowered the percentage of the decomposed trichloride from 1.22% to .020% by weight of the primary material subjected to dehydration, while the dehydration in the presence of xylene reduced the decomposition to less than 10% by weight of the antimony trichloride decomposed by ordinary dehydration in the absence of a binary-forming auxiliary agent.

Instead of a batch-wise distillation as described in the examples, the mixture of the water-containing antimony trichloride, or the like, and of the auxiliary agent may be continuously introduced, preferably after preheating to an optimum temperature, into a rectification column, such introduction being made at a suitable intermediate point of the column. The water-auxiliary agent binary is then withdrawn as an overhead fraction, while the dehydrated antimony trichloride or the like collects at the bottom of the column and may be withdrawn therefrom continuously or otherwise. The fractionating effect of the rectifying column may be increased or improved by introducing vapors of the auxiliary agent into the bottom of the column, or by reboiling at least a portion of the condensate collecting therein. If the reboiling is to be effected outside of the column, the heated compound to be thus dehydrated (e. g. antimony trichloride) should be reintroduced back into the bottom of the column. The absence of a reboiler may cause the production or formation of a bottom fraction containing a small percentage of the auxiliary agent employed, and may thus necessitate further treatment of the dehydrated compound to separate it from such agent. However, in either case, the compound is substantially or even completely free from water.

The process of the present invention has been described with particular reference to the dehydration of organic and/or inorganic high boiling compounds which decompose when in contact with relatively large percentages of water. The process is also applicable for the dehydration of water-containing mixtures of such compounds and of other substances which do not decompose at the distillation temperatures and which do not react with water and/or the substance or compound to be dehydrated. As such reference may be made to mineral oils or fractions thereof, and particularly to hydrocarbon fractions boiling above the boiling point of the compound to be dehydrated. In this connection it must be noted that antimony trichloride, as well as certain mixtures containing antimony trichloride, have been recently found to be excellent selective solvents for the separation of oils and hydrocarbon fractions into portions of different composition. Usually, mineral oils or their fractions to be extracted contain small quantities of water which generally accumulate in the extract phase obtained during the solvent extraction step. If the hydrocarbon fraction of the extract phase boils above that of the selective solvent, a distillation would cause the solvent to be vaporized together with the water which would be accompanied by all of the described defects if the solvent is of the type which is decomposed by excessive quantities of water.

On the other hand, the use of an auxiliary agent boiling between the boiling point of the water and of the solvent would prevent the decomposition of the solvent by preventing the concentration of the water in such decomposable solvent. If the dehydration and/or fractionation is accomplished in an apparatus provided with a column, a mixture of water and of the auxiliary agent (such as xylene) could then be separated as an overhead fraction and the anhydrous solvent, such as antimony trichloride, could be taken off as a side stream, leaving the hydrocarbon extract as a distillation residue. Obviously, the overhead fraction can be condensed and stratified to effect the separation of the water from the auxiliary agent, such as the mentioned xylene, which may then be returned to the column for the dehydration and/or distillation of additional quantities of the wet extract phase.

As an example, an extract phase obtained by the solvent extraction of a Venezuela residual lubricating oil with antimony chloride was continuously distilled in the following manner, this extract phase containing about 0.01% by weight of water. The wet extract phase was preheated to about 200° C. and was continuously introduced at an intermediate point of a rectification column the pressure in which was maintained at about 0.1 atmosphere absolute. Simultaneously, xylene was introduced as reflux into the upper portion of the column. In order to promote the vaporization of the antimony chloride, heat was supplied to the column, for example, by providing heating coils on at least some of the trays of the column. The water-xylene vapor mixture was removed from the upper end of the column, the anhydrous antimony trichloride at an intermediate point above the inlet for the extract phase, while the stripped extract was withdrawn as the bottoms. The antimony trichloride was found to be completely anhydrous, its recovery being substantially theoretical (i. e. 100%) since there was no decomposition thereof.

If desired, the xylene may be separated from its mixture with water. This may be effected by condensation and stratification. The xylene thus recovered may then be employed for further dehydration in accordance with the present process. Also, if it is desired to remove all of the solvent (antimony trichloride) from the bottoms withdrawn from the above-described rectifying column, it is possible to introduce some xylene vapors into the lower portion of the column, this xylene acting as a stripping agent. In the alternative, the lubricating oil fraction may be reboiled in the well-known manner.

When the mixture to be dehydrated according to the present process already contains a substance which may act as the auxiliary agent, it is unnecessary to add further quantities thereof or of a like substance. Such a case may occur when the hydrocarbon fraction subjected to solvent extraction, for example, with antimony chloride, boils above the boiling point of water but below the boiling point of the solvent to be dehydrated. In such a case the hydrocarbon fraction in the extract phase will act as the auxiliary agent, and will allow the dehydration of the antimony trichloride, or the like, without its decomposition to the oxy chloride.

Although the process has been described as applied to distillation and/or dehydration in a single column, it is to be understood that apparatus comprising two or more columns may also be employed. When a two-stage unit is used, the preheated extract phase comprising for example, a lubricating oil, antimony trichloride and water, may be introduced at an intermediate point of the first rectification column, into the bottom of which the auxiliary agent, such as xylene vapors, is introduced. The stripped lubricating oil is withdrawn from the bottom of this column, and may be reboiled if desired. However, this is unnecessary and even objectionable because such additional heating may detrimentally affect the lubricating properties of this oil. The vapors leaving from the top of the first column comprise a mixture of xylene, steam and antimony trichloride. These vapors may then be introduced into the second column wherein separation is effected, the antimony trichloride being recovered as the bottom fraction while the xylene-water binary is withdrawn as the overhead. After condensation, the water and the xylene are readily separable. A part of the xylene may then be reintroduced, after vaporization, at the bottom of the first column to aid in the stripping of further quantities of extract phase, while the remainder is employed as the reflux auxiliary agent in the second or dehydrating column. If the lubricating oil removed from the first column is stripped only with xylene, it will contain a small percentage of this agent. A subsequent treatment, for example, with steam, will remove these last traces of xylene from the oil subjected to such stripping.

I claim as my invention:

1. In a process for the separation of anhydrous antimony trichloride from mixtures thereof with minor proportions of water, the steps of commingling the water-containing antimony trichloride with xylene and distilling the mixture, thereby separately obtaining the anhydrous antimony trichloride and an overhead fraction comprising the water and the xylene.

2. In a process for the separation of substantially anhydrous antimony trichloride from mixtures thereof with water in a quantity insufficient to decompose said trichloride to its oxy chloride, the steps of commingling said water-containing antimony trichloride with toluene, and distilling said mixture to separate therefrom the water and the toluene as an overhead fraction.

3. In a process for the separation of substantially anhydrous antimony trichloride from mixtures thereof with water in a quantity insufficient to decompose said antimony trichloride to its oxy chloride, the steps of commingling the water-containing antimony trichloride with a water-immiscible substance which is miscible with the antimony trichloride, inert to the action of said trichloride and boiling between the boiling points of water and of the trichloride, and distilling said mixture to recover separately the anhydrous antimony trichloride, the water and the added substance being removed as an overhead fraction.

4. A process for the dehydration of a mixture comprising antimony trichloride and a water-insoluble, antimony trichloride soluble hydrocarbon fraction boiling above antimony trichloride, said mixture containing a minor proportion of water, which comprises commingling said mixture with an auxiliary agent boiling between the boiling points of water and of the trichloride, said agent being immiscible with water, soluble in the trichloride and unreactive therewith under the operating conditions, and distilling the resultant mixture, thereby separately recovering the high boiling hydrocarbon and the antimony trichloride in a substantially anhydrous state.

5. In a process wherein a petroleum fraction containing paraffinoid and non-paraffinoid hydrocarbons and relatively minor quantities of water is extracted with antimony trichloride, thereby producing a raffinate phase predominating in paraffinoid hydrocarbons and an extract phase containing the relatively non-paraffinoid hydrocarbons, water and the antimony trichloride, the improvement which comprises distilling the water-containing extract phase in the presence of an auxiliary agent boiling between the boiling points of water and of the antimony trichloride, said agent being immiscible with water, inert to the action of the trichloride, but soluble therein, and separately recovering the auxiliary agent and the water, as the overhead fraction, and the antimony trichloride in a substantially anhydrous state as a side cut.

6. In a process for removing water from halides of metals of the right hand column of group five of the periodic table, said halides boiling above the boiling point of water, being substantially inert to the action of small percentages of water but decomposable when the water content increases above a certain limit, the steps of commingling said metal halide containing small quantities of water with xylene, and distilling said mixture thereby separately recovering the metal halide in a substantially anhydrous condition and an overhead fraction comprising the water and the xylene.

7. In a process for removing water from halides of metals of the right hand column of group five of the periodic table, said halides boiling above the boiling point of water, being substantially inert to the action of small percentages of water, but decomposable by water in relatively large quantities, the steps of commingling said metal halide containing small percentages of water with toluene, and distilling said mixture thereby separately recovering the metal halide in a substantially anhydrous condition and an overhead fraction comprising the water and the toluene.

8. In a process for removing water from halides of metals of the right hand column of group five of the periodic table, said halides boiling above the boiling point of water, being substantially unreacted by small percentages of water but decomposable when the water content exceeds a certain limit, the steps of commingling said metal halide containing small percentages of water with an auxiliary agent boiling between the boiling point of water and that of the metal halide, said agent being inert to the action of the halide, miscible therewith but immiscible with water, and distilling said mixture thereby separately recovering the substantially anhydrous metal halide and an overhead fraction comprising water and the auxiliary agent.

9. In a process for removing water from salts of metals of the right hand column of the fifth group of the periodic table, said salts boiling above but relatively close to the boiling point of water, being substantially unreacted by small percentages of water but decomposable when the water content exceeds a certain maximum, the steps of commingling said metal salt containing small quantities of water with an auxiliary agent boiling between the boiling points of water and of the metal salt, said agent being inert to the action of said salt, miscible therewith, but immiscible with water, and distilling said mixture thereby separately recovering the substantially anhydrous metal salt and an overhead fraction comprising the water and the auxiliary agent.

ALBERT SCHAAFSMA.